Figure 1:
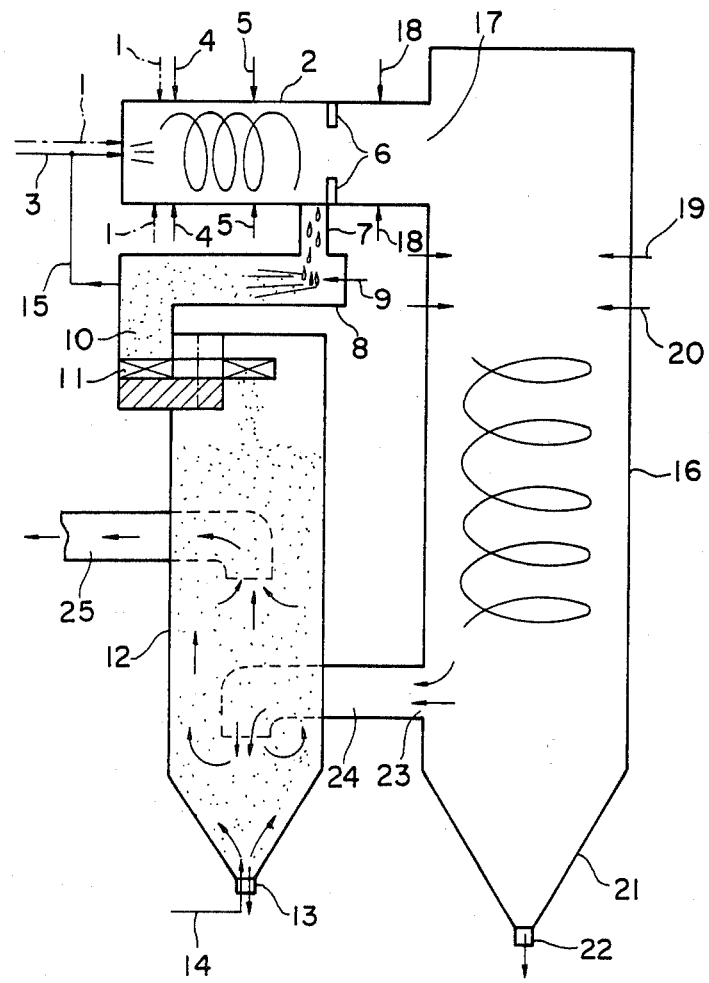

United States Patent [19]
Ishihara

[11] Patent Number: 4,566,392
[45] Date of Patent: Jan. 28, 1986

[54] SLAG TAP COMBUSTION APPARATUS

[75] Inventor: Takao Ishihara, Tokyo, Japan

[73] Assignee: Mitsubishi Jukogyo Kabushiki Kaisha, Tokyo, Japan

[21] Appl. No.: 732,238

[22] Filed: May 8, 1985

[30] Foreign Application Priority Data

Jun. 14, 1984 [JP] Japan ............................... 59-120657

[51] Int. Cl.<sup>4</sup> .............................................. F23J 1/00
[52] U.S. Cl. ................................. 110/165 R; 110/203; 110/259; 110/264; 110/345; 122/235 H
[58] Field of Search ............... 110/203, 165 R, 165 A, 110/263, 264, 204, 259, 345; 122/235 H

[56] References Cited
U.S. PATENT DOCUMENTS 3,958,518 5/1976 Yoshida ...................... 110/165 R X
4,467,732 8/1984 Taniguchi ........................... 110/259
4,472,171 9/1984 Broderick ................... 110/165 R X Primary Examiner—Edward G. Favors
Attorney, Agent, or Firm—Toren, McGeady, Stanger, Goldberg & Kiel

[57] ABSTRACT

A slag tap combustion apparatus which is characterized by comprising a slag tap combustion furnace, a slag granulation chamber for granulating a slag discharged from the slag tap combustion furnace, a slag grain accumulation tower which is filled with slag grains discharged from the slag granulation chamber, a secondary reactor provided with an inlet and an outlet for a waste gas from the slag tap combustion furnace and provided with means for introducing finely powdered lime, a duct for connecting the waste gas outlet of the secondary reactor to the slag grain accumulation tower, and another duct for allowing the waste gas to discharge from the slag accumulation tower.

3 Claims, 2 Drawing Figures

SLAG TAP COMBUSTION APPARATUS

The present invention relates to a slag tap combustion apparatus in which there is employed a system of burning an ash content by a coal-fired boiler and of taking out the same in a melting state.

According to a conventional slag tap combustion apparatus, it is feasible to remove 90 to 95%, at the maximum, of an ash content present in a coal in a melting state. conversely speaking, this means that 5 to 10% of the ash content is always contained in a combustion gas, therefore the ash content is discharged together with the combustion gas from the combustion apparatus. Moreover, most of compounds of Na, V, S, K and the like are gaseous in the combustion apparatus due to a high-temperature combustion, and these compounds take a liquid state on the surfaces of a heater and the like and will often be responsible for fouling of the heater and the like. Furthermore, if a combined plant with a gas turbine is contemplated, it can be presumed that the above-mentioned exhaust compounds will bring about serious problems.

In view of the drawbacks of the conventional technique described above, the present invention aims at the effective removal of compounds of Na, V, S, K and the like from a combustion waste gas generated in a slag tap combustion furnace, and thus also aims at the improvement in efficiency of a combined plant in which the slag tap combustion furnace is combined with a gas turbine.

According to the present invention which has been completed to solve the above-mentioned drawbacks, a slag discharged from a slag tap combustion furnace is granulated by a wind granulation or a water granulation in a slag granulation chamber; an accumulation tower is filled with the resultant slag grains; on the other hand, a combustion waste gas discharged from the slag tap combustion furnace is mixed and reacted with finely powdered lime in a secondary reactor to carry out desulfurization; the waste gas is introduced from the secondary reactor into a slag grain accumulation tower; a melted dust as well as CaO, CaSO$_4$ and compounds of Na, V, K and the like are caused to adhere to the slag grains and are removed from the waste gas; and afterward, this waste gas is then discharged from the slag grain accumulation tower.

Figure 2:
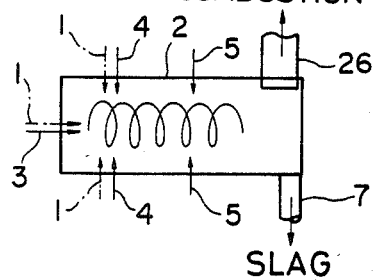

The present invention will be described in detail as an embodiment in reference to accompanying drawings, in which:

FIG. 1 is a flow sheet illustrating one embodiment of a slag tap combustion apparatus according to the present invention; and FIG. 2 shows another example of a constitution for taking out a slag from a slag tap combustion furnace.

In FIG. 1, a finely powdered coal is blown into a slag tap combustion furnace (primary reactor) 2 through a fine coal powder-feeding line 1. The blown finely powdered coal is then vigorously reacted with combustion air which is blown there through a first air line 3, in a high-load atmosphere in the slag tap combustion furnace 2. The powdery coal, while reacting, is revolved by revolving forces of the respective airs from a second air line 4 and a third air line 5, so that the coal is burned at a high temperature (1,600° to 1,700° C. or more), moving along an inner wall of the slag tap combustion furnace 2.

In consequence, an ash content resulting from the finely powdered coal due to the combustion becomes a slag stream, and this slag stream is caused to flow in a downstream direction along the inner wall of the slag tap combustion furnace 2. After reaching a slag baffle 6, the slag stream drops, in a melting state, into a slag granulation chamber 8 through a withdrawing orifice 7.

In the slag granulation chamber 8, the melted slag is blown away by a jet air or water blown thereinto through a slag-granulating jet air or water line 9 in order to carry out its wind or water granulation and simultaneously its cooling, so that the slag is converted into grains each having a diameter of several millimeters. These slag grains first drop into a slag grain trough 10 and are then fed continuously to an upper portion in a slag grain accumulation tower 12 by means of a slag grain feeder 11, so that the accumulation tower 12 is filled with the slag grains.

An upper level of the accumulated slag grains in the tower 12 can be controlled by successively taking out the slag grains from the tower 12 through a slag grain withdrawal hopper 13. Incidentally, air 14 for sealing and for cooling the slag grains is fed into the slag grain accumulation tower 12 through the above-mentioned slag grain withdrawal hopper 13, whereby the slag grains are cooled and the low-temperature slag grains can be discharged from the slag grain accumulation tower 12. Further, the above-mentioned air 9 for granulating the slag is returned to the first air line 3 through a discharge line 15.

On the other hand, the high-temperature combustion gas generated by the combustion in the slag tap combustion furnace 2 contains gaseous compounds of Na, V, K, S and the like and partially mists of SiO$_2$, Al$_2$O$_3$, FE$_2$O$_3$ and the like. This combustion gas is delivered from the slag tap combustion furnace 2 to a secondary reactor 16 through its inlet 17. In this case, air is further supplied to the inlet 17 from a fourth line 18 in addition to the above-mentioned second air line 4 and third air line 5, and an air allotment from the respective lines can properly be accomplished in order to minimize the production of NOx. The waste gas introduced into the secondary reactor 16 is cooled by air fed through a fifth air line 19, so that a temperature of the waste gas is lowered to about 1100° C. Afterward, the waste gas is mixed with finely powdered lime (the main component of which is CaO) fed into the secondary reactor furnace 16 through fine coal powder-feeding means 20, and SOx contained in the waste gas is resultingly reacted with CaO as shown below, in order to achieve desulfurization:

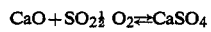

$$CaO + SO_2 + \tfrac{1}{2} O_2 \rightleftharpoons CaSO_4$$

For the purpose of advancing this reaction effectively, Ca/S=5 or more is necessary.

At the same time of this reaction, the compounds of Na, V, K and the like all become mists in a melting state and adhere to fine solid powders of CaO, CaSO$_4$ and the like. These fine solid powders descend revolving in the secondary reactor 16. A portion of the CaSO$_4$, CaO and the like is accumulated in a lower hopper 21 of the secondary reactor 16 and is taken out through an outlet 22.

The combustion waste gas is blown into a lower portion of the slag grain accumulation tower 12 through a waste gas discharge orifice 23 of the secondary reactor 16 and through a duct 24, and then flows upward through the accumulated slag grains. On the way, the melted dust as well as CaO, CaSO$_4$ and the like all contained in this waste gas adhere to the surfaces of the slag grains and are thus removed from the waste gas, and the latter is discharged from the tower 12 through a second duct 25. At this time, the low-melting compounds of Na, V, K and the like function as binders.

Therefore, the combustion waste gas discharged through the duct 25 scarcely contains the dust, and contents of NOx and SOx therein are controlled to less levels. In consequence, the thus treated combustion waste gas can be introduced directly into not only a boiler but also a gas turbine.

The above-mentioned slag tap combustion furnace 2 and secondary reactor 16 may be of a water cooling type or a heat insulating type. Further, with regard to a manner of taking out the slag from the slag tap combustion furnace 2, instead of disposing the slag baffle 6 as in FIG. 1, the slag tap combustion furnace 2 may be completely closed on the secondary reactor side as illustrated in FIG. 2, and the slag may be taken out from its lower portion through an outlet 7 and may be fed into the slag granulation chamber 8. On the other hand, the combustion waste gas may be taken out from its upper portion through a withdrawal orifice 26 and may be fed into the secondary reactor 16.

According to the present invention, the compounds of Na, V, K, S and the like in the combustion waste gas generated in the slag tap combustion furnace can be removed therefrom with a high efficiency, with the result that a denitrating device, a deslfurizing device and the like which are required in a fine powdery coal-fired boiler can be omitted. Therefore, costs can be reduced remarkably, and in the case of a pressurizing type in which the slag tap combustion apparatus of the present invention is combined with a gas turbine, the noticeable increase in a plant efficiency can be expected.

What is claimed is:

1. A slag tap combustion apparatus which is characterized by comprising a slag tap combustion furnace, a slag granulation chamber for granulating a slag discharged from said slag tap combustion furnace, a slag grain accumulation tower which is filled with slag grains discharged from said slag granulation chamber, a secondary reactor provided with an inlet and an outlet for a waste gas from said slag tap combustion furnace and provided with means for introducing finely powdered lime, a duct for connecting said waste gas outlet of said secondary reactor to said slag grain accumulation tower, and another duct for allowing the waste gas to discharge from said slag accumulation tower.

2. The slag tap combustion apparatus according to claim 1 wherein said waste gas inlet of said secondary reactor is connected to an outlet of said slag tap combustion furnace with the interposition of a slag baffle.

3. The slag tap combustion apparatus according to claim 1 wherein an outlet for said combustion waste gas is provided on an upper portion of said slag tap combustion furnace, and this outlet is connected to said secondary reactor.

* * * * *